(12) United States Patent
Aubert

(10) Patent No.: US 10,997,269 B1
(45) Date of Patent: May 4, 2021

(54) USING WEB APPLICATION COMPONENTS WITH DIFFERENT WEB APPLICATION FRAMEWORKS IN A WEB APPLICATION

(71) Applicant: EMC IP Holding Company LLC, Hopkinton, MA (US)

(72) Inventor: Raphaël Aubert, Montreal (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 79 days.

(21) Appl. No.: 16/673,052

(22) Filed: Nov. 4, 2019

(51) Int. Cl.
*G06F 16/958* (2019.01)
*G06F 11/30* (2006.01)
*H04L 29/08* (2006.01)

(52) U.S. Cl.
CPC .......... *G06F 16/958* (2019.01); *G06F 11/302* (2013.01); *G06F 11/3051* (2013.01); *H04L 67/02* (2013.01)

(58) Field of Classification Search
CPC .. G06F 16/958; G06F 11/302; G06F 11/3051; H04L 67/02
See application file for complete search history.

(56) References Cited

U.S. PATENT DOCUMENTS

| | | | | |
|---|---|---|---|---|
| 9,900,367 | B2 * | 2/2018 | Branton | H04L 67/02 |
| 10,402,064 | B1 * | 9/2019 | Al-Sallami | G06Q 20/20 |
| 2003/0154239 | A1 | 8/2003 | Davis et al. | |
| 2007/0147306 | A1 | 6/2007 | Halpern | |
| 2009/0254837 | A1 * | 10/2009 | Dybdahl | G06F 16/972 |
| | | | | 715/749 |
| 2011/0145360 | A1 | 6/2011 | Sheshagiri et al. | |
| 2012/0166963 | A1 | 6/2012 | Kohli et al. | |
| 2016/0285958 | A1 | 9/2016 | Das et al. | |

OTHER PUBLICATIONS

Michael Geers, "Micro Frontends—Extending the Microservice Idea to Frontend Development," https://micro-frontends.org/, downloaded Sep. 30, 2019, 6 pages.

* cited by examiner

*Primary Examiner* — David R Lazaro
(74) *Attorney, Agent, or Firm* — Ryan, Mason & Lewis, LLP

(57) ABSTRACT

A method includes executing a web application that utilizes different web application frameworks, registering web application components of the web application by defining lifecycle triggers for loading the web application components in pages of the web application, and monitoring for the lifecycle triggers on a communication channel. The method also includes detecting a given lifecycle trigger to load a given web application component at a specified location on a given page of the web application, the given page utilizing a first web application framework and the given web application component utilizing a second web application framework. The method further includes loading an instance of the given web application component at the specified location of the given page of the web application, and processing interactions between the instance of the given web application component and the given page of the web application via the communication channel.

20 Claims, 9 Drawing Sheets

USING WEB APPLICATION COMPONENTS WITH DIFFERENT WEB APPLICATION FRAMEWORKS IN A WEB APPLICATION

FIELD

The field relates generally to information processing, and more particularly to techniques for managing web applications.

BACKGROUND

Web applications, also referred to as web apps, are application programs designed for delivery to users over a network, such as the Internet, through a browser interface. For example, web applications include client server computer programs in which the client runs in a web browser and the web application is hosted in the server. Web applications may include web services and other website components that perform functions for users. Various software frameworks may be used to provide web applications. Such software frameworks, also referred to as web frameworks or web application frameworks, facilitate the building and deployment of web applications. For example, web application frameworks can provide common libraries for various application functions and promote code re-use.

SUMMARY

Illustrative embodiments of the present disclosure provide techniques for using web application components with different web application frameworks in a web application.

In one embodiment, a method comprises executing a web application, the web application utilizing two or more different web application frameworks, registering one or more web application components of the web application by defining one or more lifecycle triggers for loading the one or more web application components in one or more pages of the web application, and monitoring for the one or more lifecycle triggers on a communication channel for the web application. The method also comprises detecting a given one of the lifecycle triggers to load a given one of the one or more web application components at a specified location on a given one of the one or more pages of the web application, wherein the given page of the web application utilizes a first one of the two or more different web application frameworks and the given web application component utilizes a second one of the two or more different web application frameworks. The method further comprises loading an instance of the given web application component at the specified location of the given page of the web application and processing one or more interactions between the instance of the given web application component and the given page of the web application via the communication channel. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
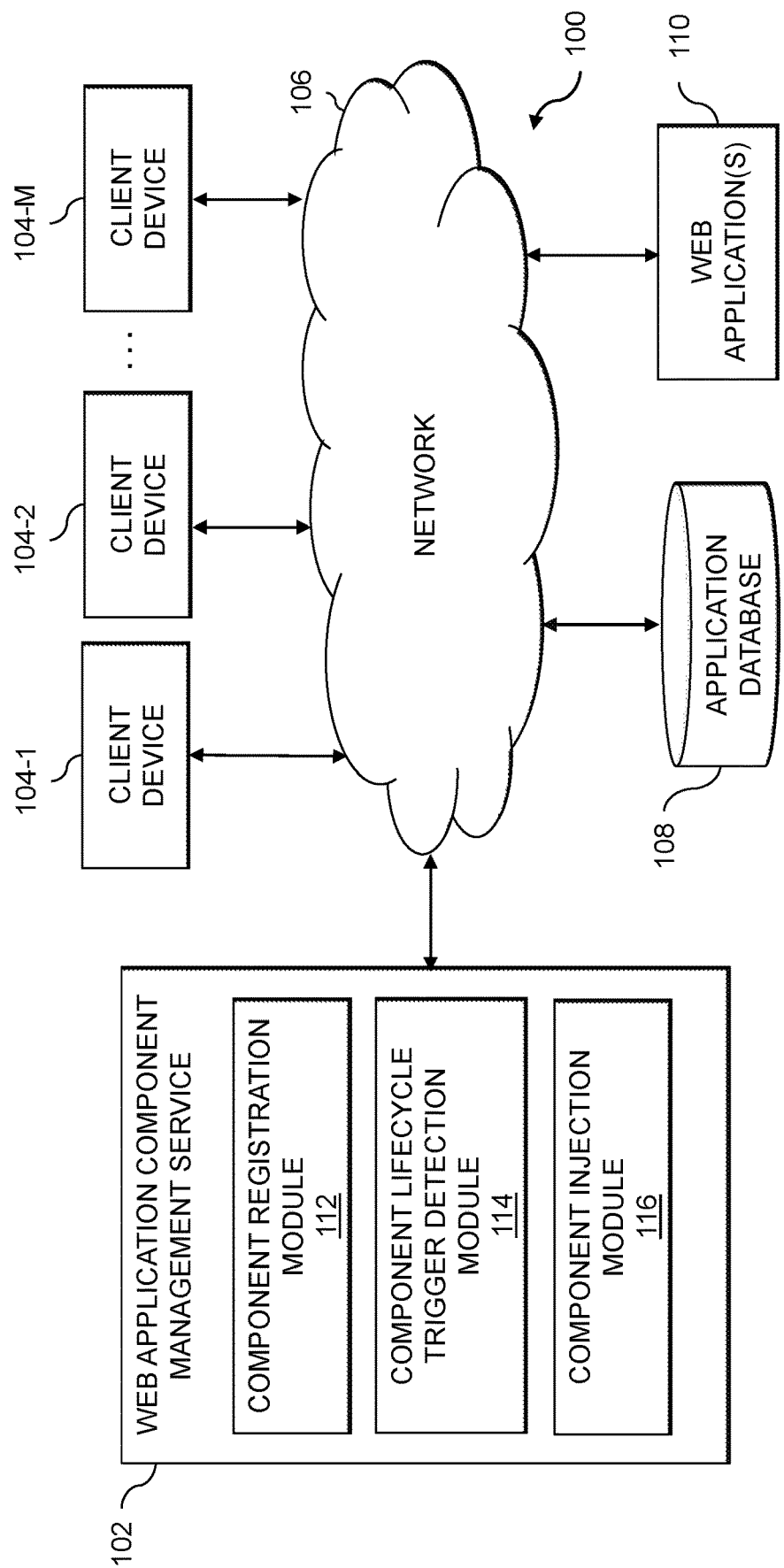
FIG. 1 is a block diagram of an information processing system for using components with different web application frameworks in a web application in an illustrative embodiment.

FIG. 1 shows an information processing system 100 configured in accordance with an illustrative embodiment. The information processing system 100 is assumed to be built on at least one processing platform and provides functionality for using web application components with different web application frameworks in a web application (e.g., in a single, unified web application). The information processing system 100 includes a web application component management service 102, which is coupled via a network 106 to a set of web applications 110. The web applications 110 are assumed to be accessed, over network 106, by client devices 104-1, 104-2, . . . 104-M (collectively, client devices 104), such as via web browsers running on the client devices 104. Also coupled to the network 106 is an application database 108, which may store various information relating to the web applications 110 as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The application database 108, as discussed above, is configured to store and record information relating to web applications 110. Such information may include, but is not limited to, information relating to the different components utilized in one or more of the web applications 110, along with associated metadata or other information relating to the web application frameworks of such components, the lifecycles of such components, etc.

The application database 108 in some embodiments is implemented using one or more storage systems or devices associated with the web application component management service 102. In some embodiments, one or more of the storage systems utilized to implement the application database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the web application component management service 102, as well as to support communication between the web application component management service 102 and other related systems and devices not explicitly shown.

In some embodiments, the client devices 104 may implement host agents that are configured for communication with the web application component management service 102. The host agents implemented by the client devices 104 may be configured to receive notifications or alerts from the web application component management service 102, such as when a particular web application has loaded one or more components into or unloaded one or more components from one or more of the web applications 110. Alerts may also be provided in the event that one or more components are not successfully loaded into or unloaded from one or more of the web applications 110. Such alerts may be provided via the host agents to ones of the client devices 104 that are operated by system administrators, information technology (IT) personnel or other users (e.g., of a software development team) that are responsible for one or more of the web applications 110, including managing components of such web applications 110 that may utilize different web application frameworks. The alerts or notifications may trigger remedial action as desired (e.g., to troubleshoot issues with loading and unloading components, etc.).

It should be noted that a "host agent" as this term is generally used herein may comprise an automated entity, such as a software entity running on a processing device. Accordingly, a host agent need not be a human entity.

Although shown as separate from the client devices 104 in the FIG. 1 embodiment, it should be appreciated that the web application component management service 102 may be implemented at least in part within one or more of the client devices 104 in some embodiments.

The web application component management service 102 in the FIG. 1 embodiment is assumed to be implemented using at least one processing device. Each such processing device generally comprises at least one processor and an associated memory, and implements one or more functional modules for controlling certain features of the web application component management service 102. In the FIG. 1 embodiment, the web application component management service 102 implements a component registration module 112, a component lifecycle trigger detection module 114, and a component injection module 116.

The web application component management service 102 is configured to execute one or more of the web applications 110, wherein the web applications 110 are assumed to utilize multiple different web application frameworks. In some cases, for example, a given one of the web applications 110 is in the process of being migrated from a first web application framework to a second web application framework, such that some pages and web application components of the given web application utilize the second web application framework while other web application components still utilize the first web application framework. In other cases, a given web application is not being migrated between web application frameworks, but still utilizes web application components from two or more different web application frameworks.

The component registration module 112 is configured to register web application components of the web application 110. This may include, for example, initializing component providers for each of the different web application frameworks utilized by a particular web application. Each such component provider will register its own web application components by defining lifecycle triggers for loading and unloading such web application components in pages of the web application.

The component lifecycle trigger detection module 114 is configured to monitor for the defined lifecycle triggers on a communication channel for the web application. The communication channel is shared by the above-described component providers, as well as application and page controllers. The above-described component providers may implement listeners that analyze events on the shared communication channel (e.g., opening a page of the web application, changing a page of the web application, activating user interface features of the web application, etc.) to detect when one or more of the defined lifecycle triggers occur. The component lifecycle trigger detection module 114 is further configured to detect a given one of the lifecycle triggers, and to load a given one of the one or more web application components at a specified location on a given one of the one or more pages of the web application, wherein the given page of the web application utilizes a first one of the two or more different web application frameworks and the given web application component utilizes a second one of the two or more different web application frameworks.

The component injection module 116 is configured to load an instance of the given web application component at the specified location of the given page of the web application, and process interactions between the instance of the given web application component and the given page of the web application via the shared communication channel.

It is to be appreciated that the particular arrangement of the web application component management service 102, the component registration module 112, the component lifecycle trigger detection module 114, and the component injection module 116 illustrated in the FIG. 1 embodiment is presented by way of example only, and alternative arrangements can be used in other embodiments. As discussed above, for example, the web application component management service 102, the component registration module 112, the component lifecycle trigger detection module 114, and the component injection module 116 may in some embodiments be implemented internal to one or more of the client devices 104. As another example, the functionality associated with the component registration module 112, the component lifecycle trigger detection module 114, and the component injection module 116 may be combined into one module, or separated across more than three modules with the multiple modules possibly being implemented with multiple distinct processors or processing devices.

At least portions of the component registration module 112, the component lifecycle trigger detection module 114, and the component injection module 116 may be implemented at least in part in the form of software that is stored in memory and executed by a processor.

It is to be understood that the particular set of elements shown in FIG. 1 for using web application components with different web application frameworks in a web application is presented by way of illustrative example only, and in other embodiments additional or alternative elements may be used. Thus, another embodiment may include additional or alternative systems, devices and other network entities, as well as different arrangements of modules and other components.

The web application component management service 102 and other portions of the system 100 may be part of cloud infrastructure as will be described in further detail below. The cloud infrastructure hosting the web application component management service 102 may also host one or more of the web applications 110.

The web application component management service 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The web application component management service 102, client devices 104, application database 108 and web applications 110 or components thereof may be implemented on respective distinct processing platforms, although numerous other arrangements are possible. For example, in some embodiments at least portions of the web application component management service 102 and one or more of the web applications 110 are implemented on the same processing platform. A given one of the web applications 110 can therefore be implemented at least in part within at least one processing platform that implements at least a portion of the web application component management service 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the web application component management service 102, client devices 104, application database 108 and web applications 110, or portions or components thereof, to reside in different data centers. Numerous other distributed implementations are possible. The web application component management service 102 or portions thereof can also be implemented in a distributed manner across multiple data centers.

Additional examples of processing platforms utilized to implement the web application component management service 102 and other portions of the system 100 in illustrative embodiments will be described in more detail below in conjunction with FIGS. 6 and 7.

It is to be appreciated that these and other features of illustrative embodiments are presented by way of example only, and should not be construed as limiting in any way.

An exemplary process for using web application components with different web application frameworks in a web application will now be described in more detail with reference to the flow diagram of FIG. 2. It is to be understood that this particular process is only an example, and that additional or alternative processes for using web application components with different web application frameworks in a web application may be used in other embodiments.

In this embodiment, the process includes steps 200 through 210. These steps are assumed to be performed by the web application component management service 102 utilizing the component registration module 112, the component lifecycle trigger detection module 114, and the component injection module 116. The process begins with step 200, executing a web application that utilizes two or more different web application frameworks. In step 202, one or more web application components of the web application are registered by defining one or more lifecycle triggers for loading the one or more web application components in one or more pages of the web application. The web application components may comprise charts, tables, plots, visualizations, widgets, user interface features for controlling one or more elements of pages of the web application, etc.

Step 202 may include bootstrapping (e.g., at startup of the web application) or loading (e.g., on demand) a first component provider for the first web application framework and a second component provider for the second application framework. The first component provider registers one or more lifecycle triggers for one or more web application components that utilize the first web application framework and listens for events on the communication channel corresponding to the one or more lifecycle triggers for the one or more web application components that utilize the first web application framework. The second component provider registers one or more lifecycle triggers for one or more web application components that utilize the second web application framework and listens for events on the communication channel corresponding to the one or more lifecycle triggers for the one or more web application components that utilize the second web application framework.

Figure 2:
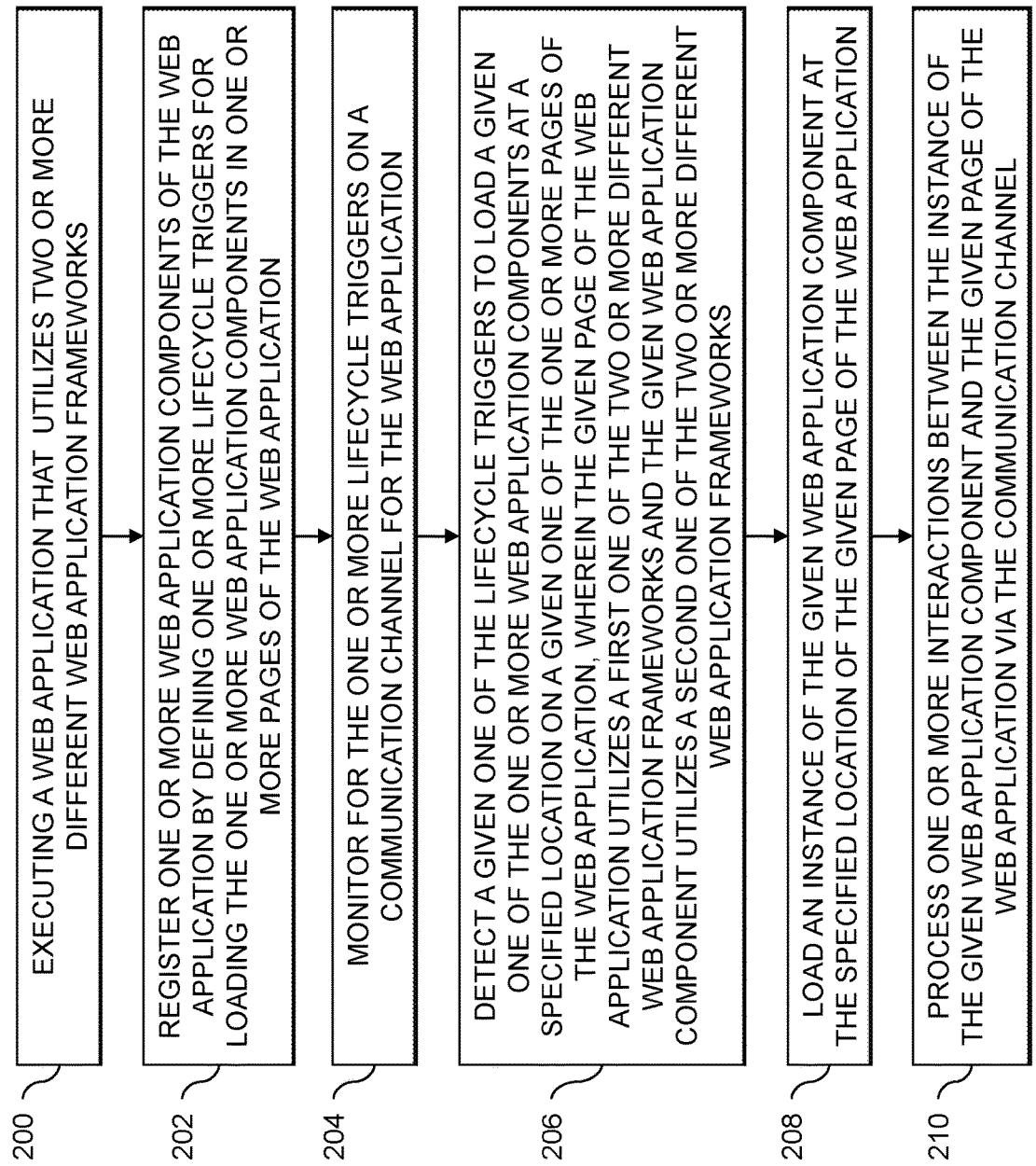
FIG. 2 is a flow diagram of an exemplary process for using components with different web application frameworks in a web application in an illustrative embodiment.

The FIG. 2 process continues with step 204, monitoring for the one or more lifecycle triggers on a communication channel for the web application. In step 206, a given one of the lifecycle triggers to load a given one of the one or more web application components at a specified location on a given one of the one or more pages of the web application is detected. The given page of the web application utilizes a first one of the two or more different web application frameworks and the given web application component utilizes a second one of the two or more different web application frameworks.

In step 208, an instance of the given web application component is loaded at the specified location of the given page of the web application. Interaction between the instance of the given web application component and the given page of the web application is processed in step 210 via the communication channel.

In some embodiments, step 206 includes detecting a request to display the given page of the web application. Responsive to detecting the request to display the given page of the web application, the FIG. 2 process may further include publishing a component listing request to the communication channel, receiving metadata for the registered web application components from the communication channel, the metadata comprising information regarding availability of the registered web application components, and determining whether the given web application component is available and compatible with the given page of the web application based at least in part on the received metadata.

Step 206 may comprise publishing a component request for the given web application component to the communication channel. The component request may specify a container for the given web application component, a configuration of the given web application component and one or more listeners for the given web application component. Step 208 may include analyzing the specified configuration of the given web application component in the component request for compatibility, creating an instance of the given web application component running in the second web application framework, injecting the instance of the given web application component at the specified location of the given page, and instantiating the one or more listeners to monitor for events on the communication channel corresponding to defined lifecycle triggers of the given web application component.

In some embodiments, step 202 further comprises defining one or more lifecycle triggers for unloading the one or more web application components. In such embodiments, the FIG. 2 process may further include detecting a given one of the lifecycle triggers to unload the given web application component, and removing the instance of the given web application component from the given page of the web application. Detecting the given lifecycle trigger to unload the given web application component may comprise detecting a request to change to another page of the web application.

It should be appreciated that steps 206 through 210 of the FIG. 2 process may be repeated as necessary or desired. For example, multiple lifecycle triggers may be detected, including the given lifecycle trigger for the given web application component and one or more additional lifecycle triggers for one or more additional web application components. Such additional web application components may utilize the first web application framework (e.g., the same web application framework as the given page) or a third web application framework (e.g., a web application framework different than that used for the given page and the given web application component).

When a web application's lifecycle spans across a wide time range, the web application frameworks that the web application relies upon can become deprecated, or evolve in ways that are not backward compatible. In some cases, the web application frameworks may lack features that other web applications frameworks could provide. Any major framework migration of a web application (e.g., migration from jQuery to React, or migrating from one user interface (UI) framework to another, etc.) requires a tremendous amount of time, effort and resources. In some cases, a "chunk-based" web application migration process may be used for migrating a web application or portions thereof between different web application frameworks. U.S. patent application Ser. No. 16/588,168, titled "Migration of Web Applications Between Different Web Application Frameworks," describes illustrative techniques for implementing such chunk-based web application migration processes. Even if chunk-based web application migration processes are employed to migrate a few pieces or portions of a web application at a time, various high-level component visuals and behavior may not change and are migrated with similar looks and behavior. Nevertheless, a rewrite of such components still requires time, effort and resources.

In some cases, when a web application framework evolves in an incompatible way, a developer of that web application framework may provide a migration tool. Such migration tools, however, often require partial component code re-writes and only support a very specific initial web application framework. Further, in most cases migration tools are not available. An alternative to re-writing components is to use web components, but this must be done upfront. However, in such cases there will be no migration as no web application framework will be used. Such an approach can also be inconvenient as it relies on hypertext markup language (HTTP) data (e.g., in other words, strings only) and cannot react as well as the component management techniques described herein.

Another option for avoiding component re-writes is to use standalone chunks of a web application. This option severely limits the possible interactions as the chunk must be standalone and not necessarily react to all possible external events. This option also has the disadvantage of being quite large in terms of size and thus could not be efficiently applied to many components of a web application.

Illustrative embodiments provide techniques that enable component reuse between different web application frameworks, thus avoiding the time, effort and resources for rewriting components whose looks and behavior do not change while migrating a web application between different web application frameworks. The time, effort and resources may instead be focused or expended when a component is to be upgraded (e.g., which may involve changes to visuals and behavior thereof), so that migrating the component also provides value. Advantageously, some embodiments avoid wasting time, effort and resources when migrating a web application between different web application frameworks, keeping unchanged and potentially complex components out of the migration until value-adding changes to such components are actually requested. Web application framework migration is a process that may happen relatively infrequently in a web application's lifetime. When web application framework migration occurs, however, it negatively affects almost all aspects of the web application development including planning, rolling out new features, etc. The techniques described herein for component reuse limit the potential negative effects of web application framework migration, allowing development to focus on the essential parts both for the web application and end users thereof.

As used herein, a component of a web application refers to a component that brings high-level functionality. An example of a component bringing high-level functionality is a component for display of a chart, table, plot, graph, a list of items with details, a visualization, a user interface features for controlling one or more elements (e.g., a web application widget, etc.). It should be appreciated, however, that these are merely examples of components of a web application. A component may also handle calls to the backend of the web application. For example, a component providing a chart or other visualization may allow for time range or other parameter selection thereof, configuration of various interactions within the chart, etc. More generally, a component of a web application is a standalone portion of a page of the web application. A component can potentially interact with other components as well as services or the backend of the web application. The more complex the component, the more worthwhile it is to reuse code for that component rather than re-writing that code for a new framework.

In some embodiments, techniques are provided for injecting components developed in a first web application framework (e.g., a "previous" web application framework) directly into a second web application framework (e.g., a "new" web application framework). It should be understood that the second or new web application framework may be one that the web application or a portion thereof is being migrated to from the first or previous web application framework. The first and second web application frameworks may be different web application frameworks, different versions of the same web application framework, etc. The component developed in the first web application framework is directly injected into the second web application framework such that the component is able to interact, through configuration, data and events, with other components developed in the second web application framework. Advantageously, this avoids the need for code re-writes at the component level, while still upgrading the main web application framework of the web application and maintaining the ability to migrate components to the second web application framework on an as-needed or as-desired basis. Further, the techniques described herein provide the ability to perform version and type validation to ensure better compatibility.

It should be noted that while various embodiments are described herein in the context of a web application or portion thereof that is being migrated from a first or previous web application framework to a second or new web application framework, embodiments are not limited to this context. For example, the techniques described herein may be used to leverage a component or set of components developed in a different web application framework than that used for a particular web application, instead of requiring re-writes of such components in the current web application framework used by the web application. Thus, some embodiments enable sharing of components between different web application frameworks.

As discussed above, some embodiments provide techniques for injecting existing components (e.g., written in a first web application framework) to be injected into pages of a web application that are written in a different web application framework (e.g., a second web application framework). This avoids unnecessary re-writes of the code for potentially complex components used by a web application until such re-writes are actually needed (e.g., due to changes in the visuals or behavior of the components, upgrading components with new features, etc.). Pages of a web application that are created with a new web application framework are able to inject components created with the previous web application framework where and when required, and also allow the pages of the web application and components thereof written in the new web application framework to interact with the injected components written in the previous web application framework (e.g., seamlessly or almost seamlessly in terms of data, events, etc.). In some embodiments, each web application framework needs to be included only once in the page, and each web application framework is configured to bring all its shared components as a single bundle. In this way, web application framework duplication and its associated computational load are avoided.

Figure 3:
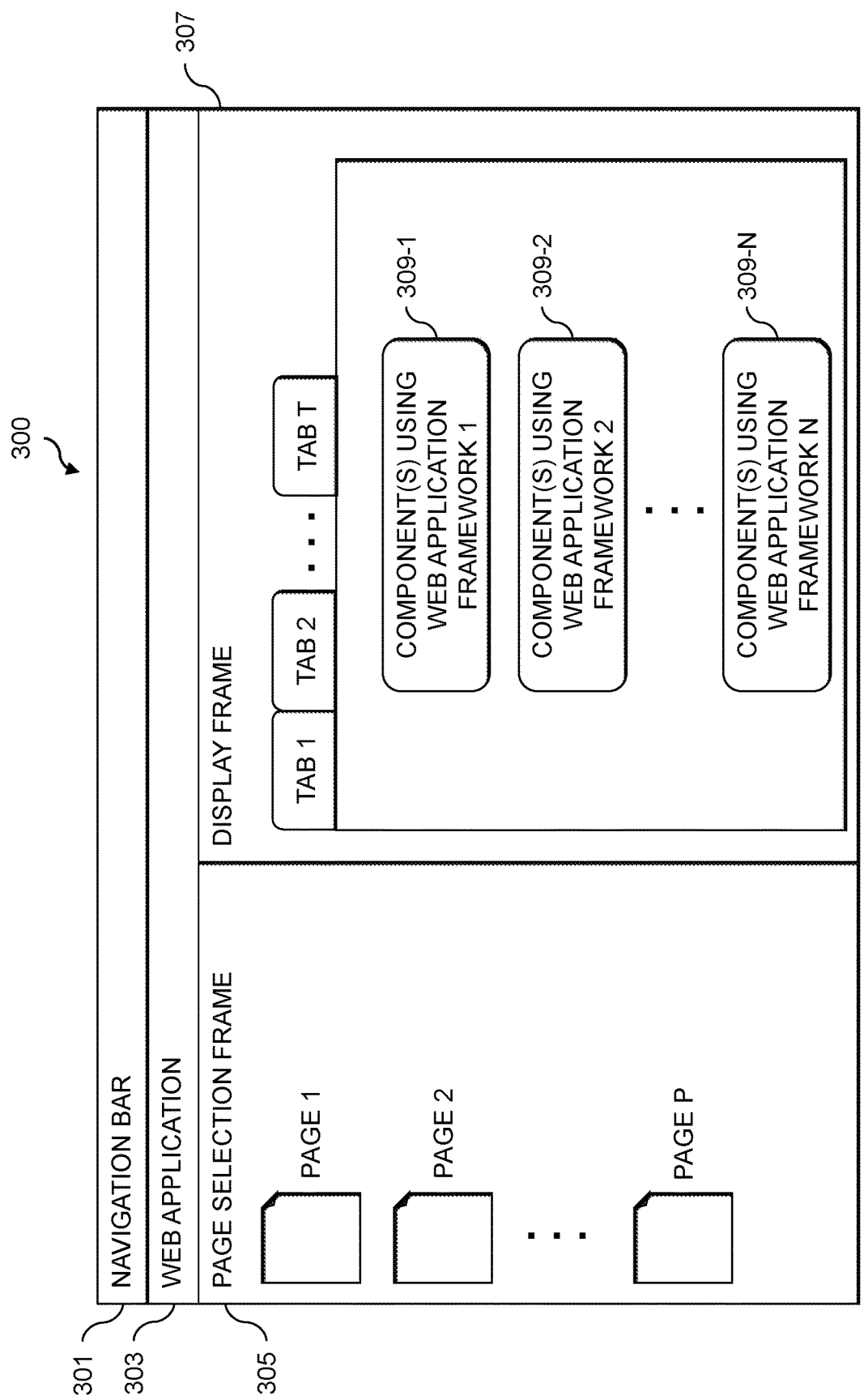
FIG. 3 illustrates a view of different portions of a web application in an illustrative embodiment.

FIG. 3 shows an example layout 300 of a web application that utilizes components with different web application frameworks. The layout 300 includes a navigation bar 301, which may be a portion of a web browser that is utilized to type in or otherwise input uniform resource locators (URLs) to load web application 303. The web application also includes a page selection frame 305, allowing a user to select from pages 1, 2, . . . P to present in the display frame 307. The display frame 307 as shown includes a set of tabs 1, 2, . . . T. When a particular page and tab are selected (e.g., page 1, tab 1) that page or tab gets loaded into the display frame 307, along with a set of components 309-1, 309-2, . . . 309-N (collectively, components 309) with different web application frameworks 1, 2, . . . N. The components 309 may comprise charts, plots, tables, visualizations, widgets, etc.

Figure 4:
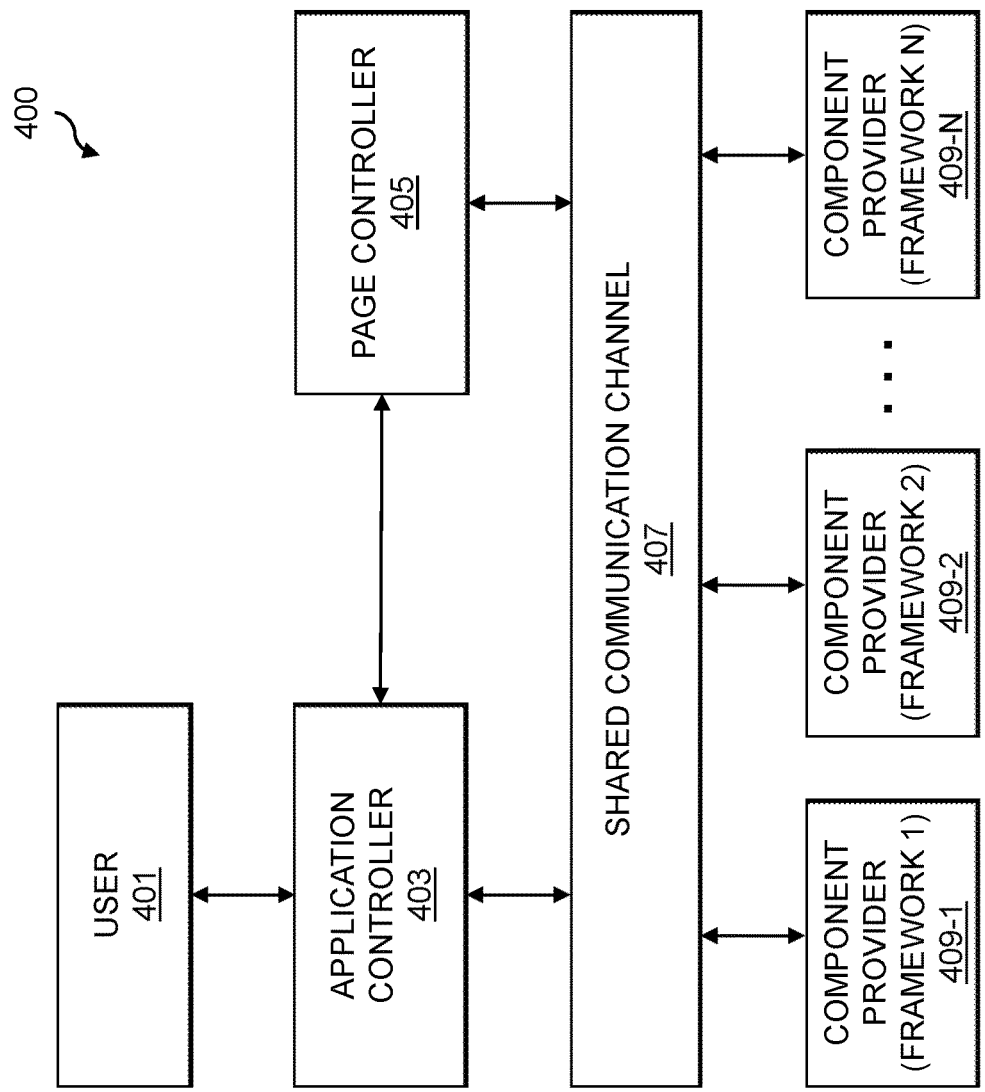
FIG. 4 shows a system for using components with different web application frameworks in a web application in in illustrative embodiment.

FIG. 4 shows a system 400 for using components with different web application frameworks in a web application. The system 400 includes a user 401 (e.g., a web browser running on one of client devices 104) that interacts with an application controller 403 of a web application to navigate between different pages of the web application. The application controller 403 is configured to load (e.g., open and display) and unload (e.g., change) pages of the web application in response to user requests using a page controller 405. The application controller 403 and page controller 405 are coupled to a shared communication channel 407, which provides an interface for different component providers 409-1, 409-2, . . . 409-N (collectively, component providers 409) that are associated with different web application frameworks 1, 2, . . . N, to make components available for use within the web application. Advantageously, the web application framework of each component provider 409 is injected only once for all its associated components. Thus, there is little or no impact on performance or memory requirements.

The shared communication channel 407 may be implemented as an API or other defined interface which exposes functions for performing the actions described herein. In some implementations, the shared communication channel 407 is a pass-through interface that lets the page controller 405 requesting components communicate directly with the component providers 409. In other implementations, the shared communication channel 407 may be more complex and provides functions for data manipulation and adaptation, such that the page controller 405 can send relatively simple requests based on as little configuration as possible, and the component providers 409 can similarly send relatively simple request. The shared communication channel 407 in such implementations does most of the data transformation and other work for the web application framework on which the provided component is based, such that a complex piece of code is needed at only a single place.

The component providers 409 make their associated components available through or depending on the associated web application framework. For example, a component provider 409 for the AngularJS web application framework can make components available through the AngularJS web application framework and an internal compiler.

The application controller 403 and page controller 405 may be components that are part of the client-side application (e.g., the web browser) of the user 401. The page controller 405 may be defined in the "new" web application framework (e.g., the web application framework that a particular web application is being migrated to), while the application controller 403 may be web application framework-agnostic.

When the user 401 opens the web application, the application controller 403 will send a request to the shared communication channel 407 to initialize listeners for each of the component providers 409. As the user 401 navigates to different pages of the web application, the application controller 403 directs the page controller 405 to load and unload different pages of the web application. The page controller 405, via the shared communication channel 407, requests the necessary components for a particular page of the web application from the component providers 409. The component providers 409 create and inject the requested components into the pages of the web application, and provide lifecycle information for the requested components back to the page controller 405. The page controller 405 utilizes the lifecycle information to determine when to load (e.g., mount and initialize) and unload (e.g., remove and destroy) components as the user 401 changes between pages of the web application or otherwise utilizes UI features of the web application that correspond to defined and registered lifecycle triggers (e.g., application "hooks" for intercepting events and initiating load or unload of components of the web application).

A web application may allow multiple web application frameworks to coexist in a single page of the web application. Component injection in some embodiments utilizes a shared bus or communication channel 407 for communication (e.g., between components, between components and a backend or services of the web application, etc.). Component lifecycles are also defined for each component, where the component lifecycle for a given component includes the application hooks for loading and unloading the given component. Component providers 409 (e.g., component provider APIs) are also utilized, which register components in their own web application framework, provide component metadata when requested, and provide component wrappers respecting the defined lifecycle hooks. Component requesters (e.g., component requester APIs) are configured to check component metadata for compatibility check purposes, to request components on the shared communication channel 407, to provide required configuration for components, to subscribe to created component events, and to call proper component lifecycle hooks when applicable.

An example will now be described, where it is assumed that a web application is being migrated from a first web application framework to a second web application framework. More particularly, the example below assumes that the migration is from the AngularJS web application framework to the Angular web application framework, though it should be understood that embodiments are not limited to use with these specific web application frameworks.

When the web application frameworks used in a particular web application (e.g., AngularJS and Angular) are bootstrapped (e.g., at startup) or loaded (e.g., for web application frameworks that support on-demand or as-needed loading, also referred to as "lazy-loading"), each component provider 409 registers its own components into its own web application framework and starts listening for events on the shared communication channel 407. The components may be made available through the use of unique identifiers (IDs).

When a specific page of the web application is displayed using a particular web application framework (e.g., Angular) but that page relies on components from another framework (e.g., AngularJS), the page controller 405 will perform the following. As an optional step, the page controller 405 will publish a component listing request, which may include filtering options, to receive metadata for available components to ensure that the requested component is available and compatible (e.g., based on its unique ID, version information, etc.). The page controller 405 publishes a component request, providing a container element (e.g., an HTTP element or HTTP container), a component configuration and a required listener for proper component setup. The page controller 405 will also register itself for cleanup purposes for when the requested component is destroyed. The page controller 405 waits until the requested component is ready and receives its lifecycle hooks, and registers the component lifecycle destruction as part of its own destruction.

When a component provider 409 receives a request for a component that it owns or otherwise manages, the component provider 409 will ensure that the provided configuration is correct and then inject the component within a location (e.g., specified in the component request) having the component running in its initial web application framework. The component provider 409 registers data to the injected component, and sends back component lifecycle hooks.

Any component interaction with the rest of the page of the web application goes through the configuration and listeners that are provided by the requester at the component request time. Such component interaction happens seamlessly (e.g., using JavaScript and any native API) without any dependency on the web application frameworks.

When the page of the web application is in the process of being replaced by another page, the component lifecycle destruction hooks will be triggered, both for the page and the injected component(s) thereof.

It should be noted that the techniques described herein support multiple levels of migration between web application frameworks. While described above with respect to using two web application frameworks, embodiments are not limited to use with two web application frameworks. For example, components may potentially be injected into a page of a given web application from multiple previous web application frameworks.

Figure 5A:
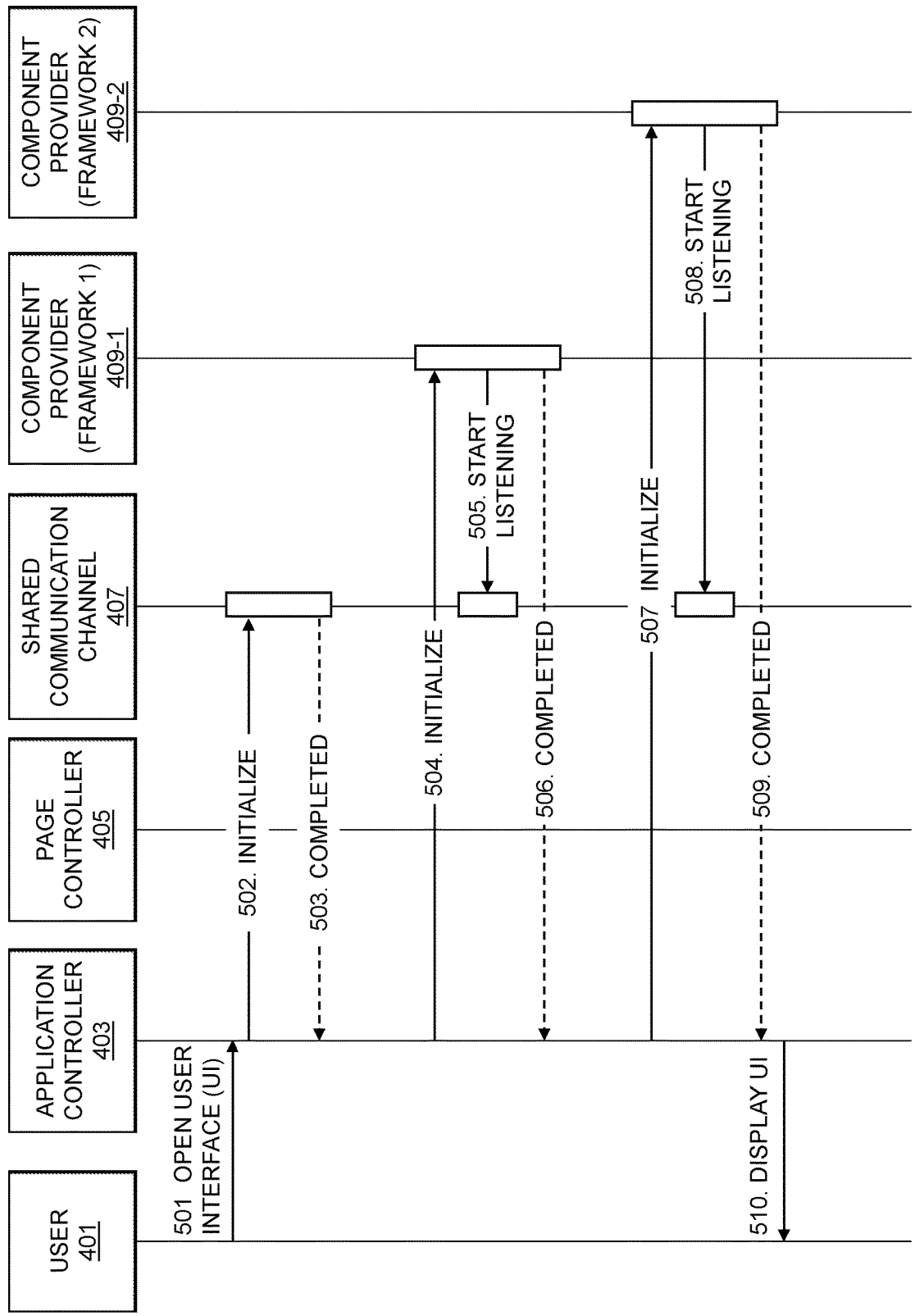
FIGS. 5A-5C show a system flow for using components with different web application frameworks in a web application in an illustrative embodiment.
Figure 5B:
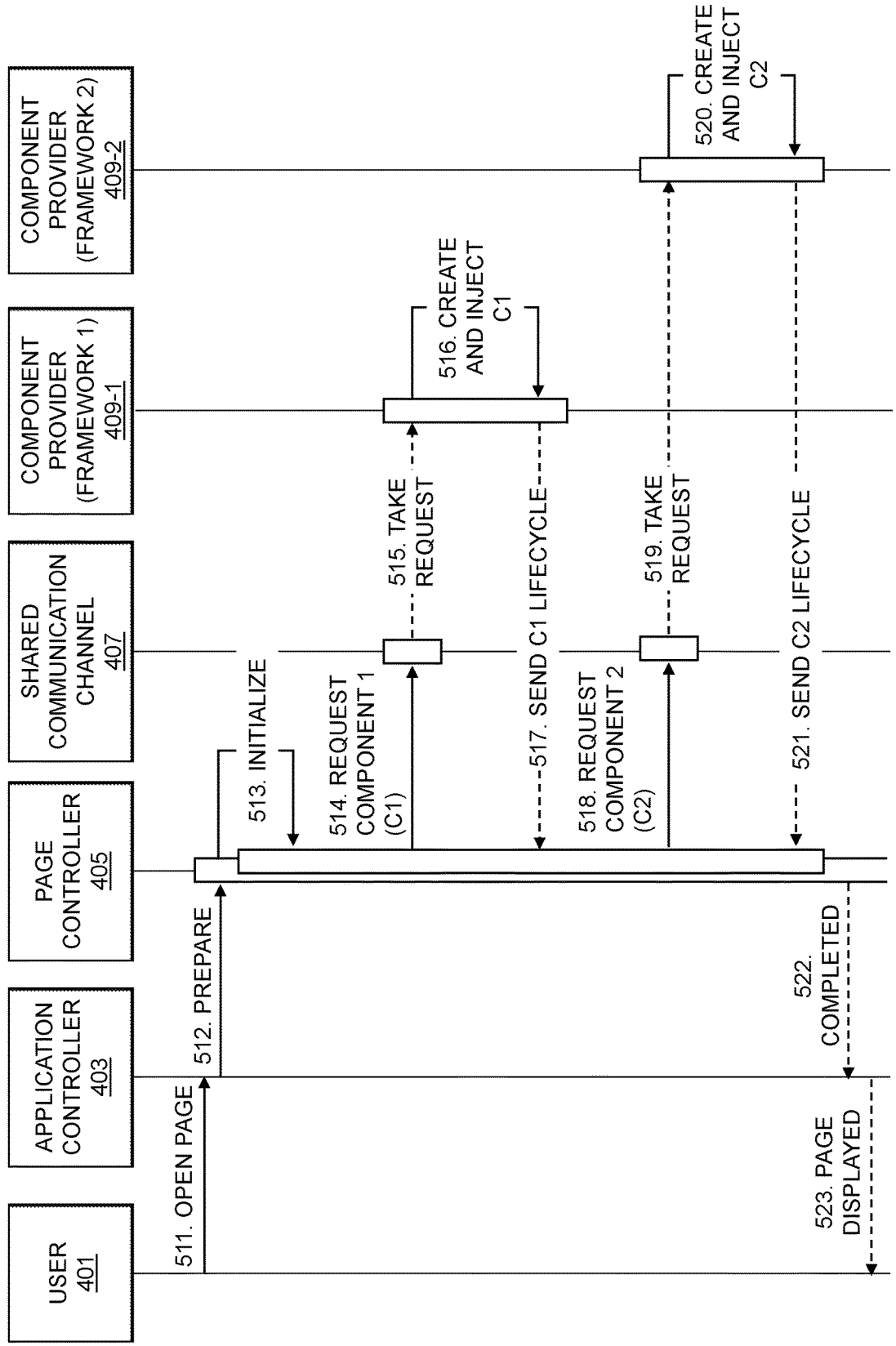
Figure 5C:
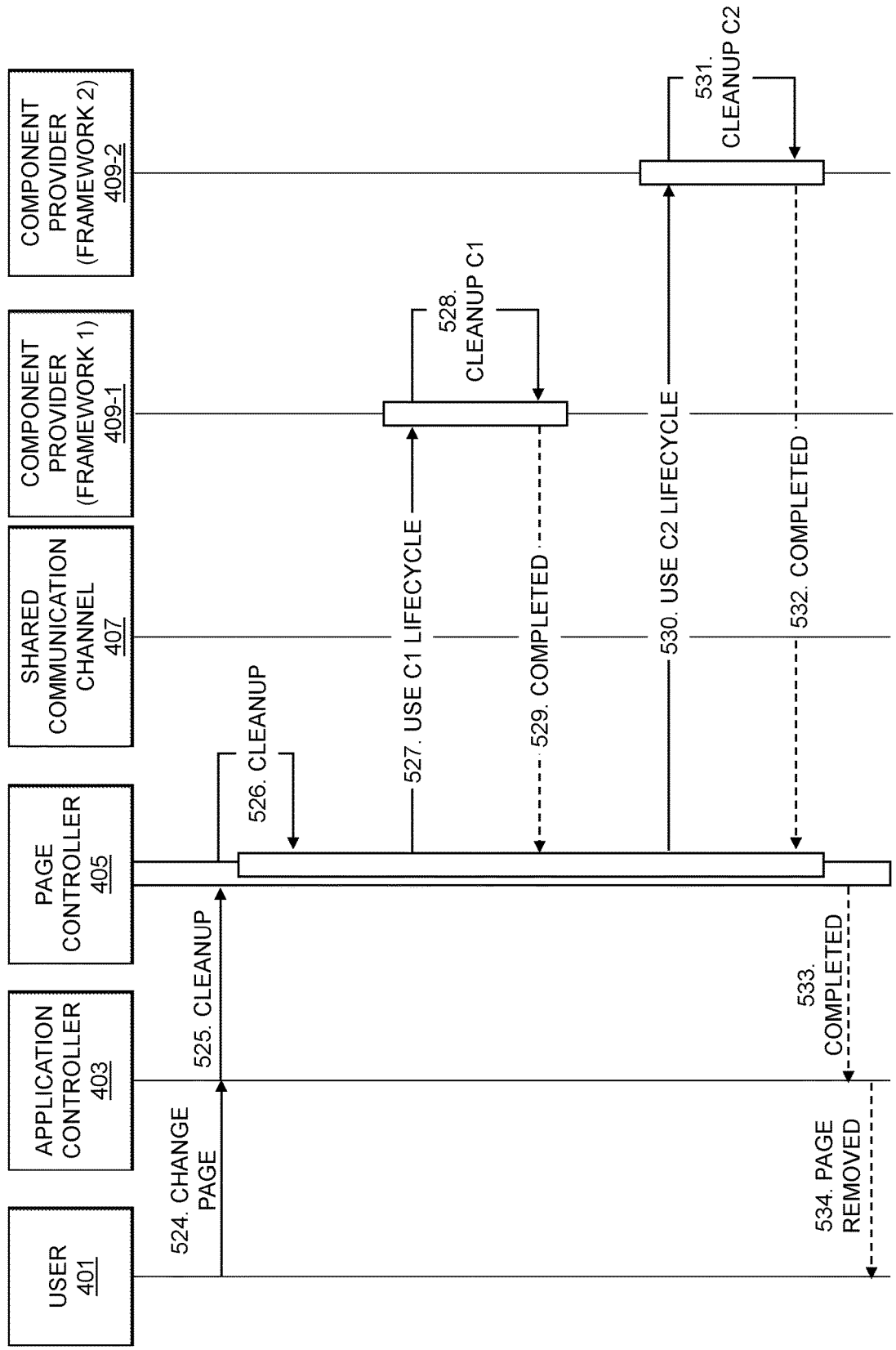

FIGS. 5A-5C show a flow for injecting components from multiple web application frameworks into a web application using the system 400. The sequence of actions shown in FIGS. 5A-5C could be completed with the retrieval of available component metadata for stricter checks, along with additional interactions in embodiments where there are live data or input updates. The flow begins in step 501, where the user 401 opens a UI using the application controller 403. In response, the application controller 403 initializes the shared communication channel 407 in step 502. The shared communication channel 407 is run, and returns an indication that the initialization is completed in step 503. In steps 504 and 507, the application controller 403 initializes respective component providers 409-1 and 409-2 providing web application frameworks 1 and 2. In steps 505 and 508, the component providers 409-1 and 409-2 start listening on the shared communication channel 407 (e.g., for calls or requests to the components they manage). In steps 506 and 509, the component providers 409-1 and 409-2 indicate to the application controller 403 that initialization is completed. In step 510, the application controller 403 displays the UI to the user 401.

The user 401 then sends a request in step 511 to the application controller 403 to open a page of the web application. The application controller 403 in turn directs the page controller 405 to prepare the requested page in step 512. The page controller 405 initializes the requested page in step 513, and begins requesting components that are utilized in the requested page. In steps 514 and 518, the page controller 405 sends respective requests to the shared communication channel 407 for component 1 (C1) and component 2 (C2). In steps 515 and 519, the shared communication channel 407 sends take requests to the associated component providers 409-1 and 409-2. In steps 516 and 520, the component providers 409-1 and 409-2 create and inject the requested components C1 and C2 into the page of the web application. In steps 517 and 521, the component providers 409-1 and 409-2 send C1 and C2 lifecycle information to the page controller 405 (e.g., for determining when to load and unload the injected components C1 and C2). Once finished with these steps, the page controller 405 sends a completed message 522 to the application controller 403. The application controller 403 then displays the page to the user 401 in step 523.

In step 524, the user 401 sends a request to the application controller 403 to change the page of the web application. In response, the application controller 403 sends a request 525 to the page controller 405 to initiate a cleanup operation. In step 526, the page controller 405 initializes the cleanup operation and reads the C1 and C2 lifecycle information to determine that the components C1 and C2 should be unloaded or destroyed. In steps 527 and 530, the page controller 405 uses the C1 and C2 lifecycle information to initiate cleanup of C1 and C2 by the component providers 409-1 and 409-2. In steps 528 and 531, the component providers 409-1 and 409-2 cleanup C1 and C2. In steps 529 and 532, the component providers 409-1 and 409-2 send completion messages to the page controller 405. The page controller 405 forwards a completion message 533 to the application controller 403. The application controller 403 removes the page in step 534.

While FIGS. 5A-5C illustrate an example where two components C1 and C2 that utilize two different web application frameworks are injected in a particular page of a web application, it should be noted that more or fewer components may be injected into a page of a web application as desired. Further, it should be appreciated that each component provider 409 may provide multiple components that are injected into a particular page of a web application. Thus, component C1 may represent a first set of one or more components that utilize web application framework 1 and are managed by the component provider 409-1 while the component C2 may represent a second set of one or more components that utilize web application framework 2 and are managed by the component provider 409-2. It should also be appreciated that components that utilize more than two different frameworks may be injected into a page of a web application. For example, a third set C3 of one or more components that utilize web application framework 3 and are managed by a component provider 409-3 may be injected into a page, along with components C1 and C2 utilizing web application frameworks 1 and 2. Further, it should be appreciated that in some cases a component is not unloaded or destroyed when changing the page of the web application. For example, component C1 may be used in first and second pages of the web application, while component C3 is used only in the first page of the web application. When the user 401 changes from the first page to the second page in this example, the cleanup operation will involve unloading or destroying C2 but not C1.

Advantageously, the techniques described herein are non-disruptive, both at the development level and the user experience (UX) level, allowing reuse of components as a web application moves between different web application frameworks. This also allows for parallel updates to be performed, bringing added value to end-users at the same time. While various embodiments are described herein in the context of Software-as-a-Service (SaaS) solutions, the techniques described herein are not limited to the SaaS context and may instead be used on any type of web application.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for using web application components with different web application frameworks in a web application will now be described in greater detail with reference to FIGS. 6 and 7. Although described in the context of system 100, these platforms may also be used to implement at least portions of other information processing systems in other embodiments.

Figure 6:
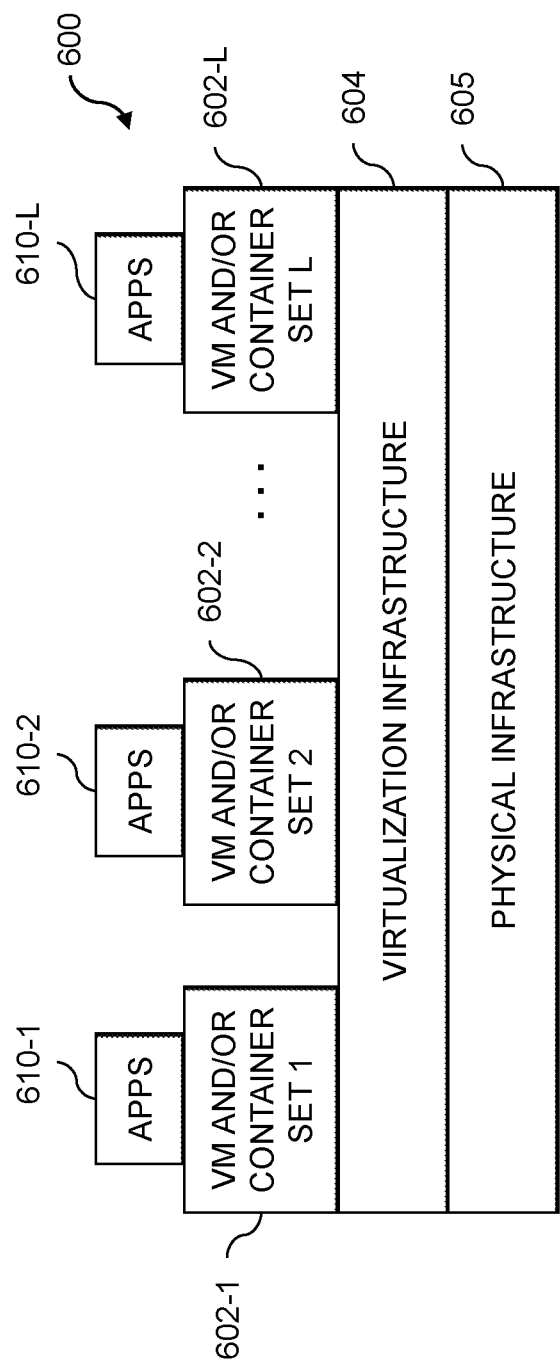
FIGS. 6 and 7 show examples of processing platforms that may be utilized to implement at least a portion of an information processing system in illustrative embodiments.
Figure 7:
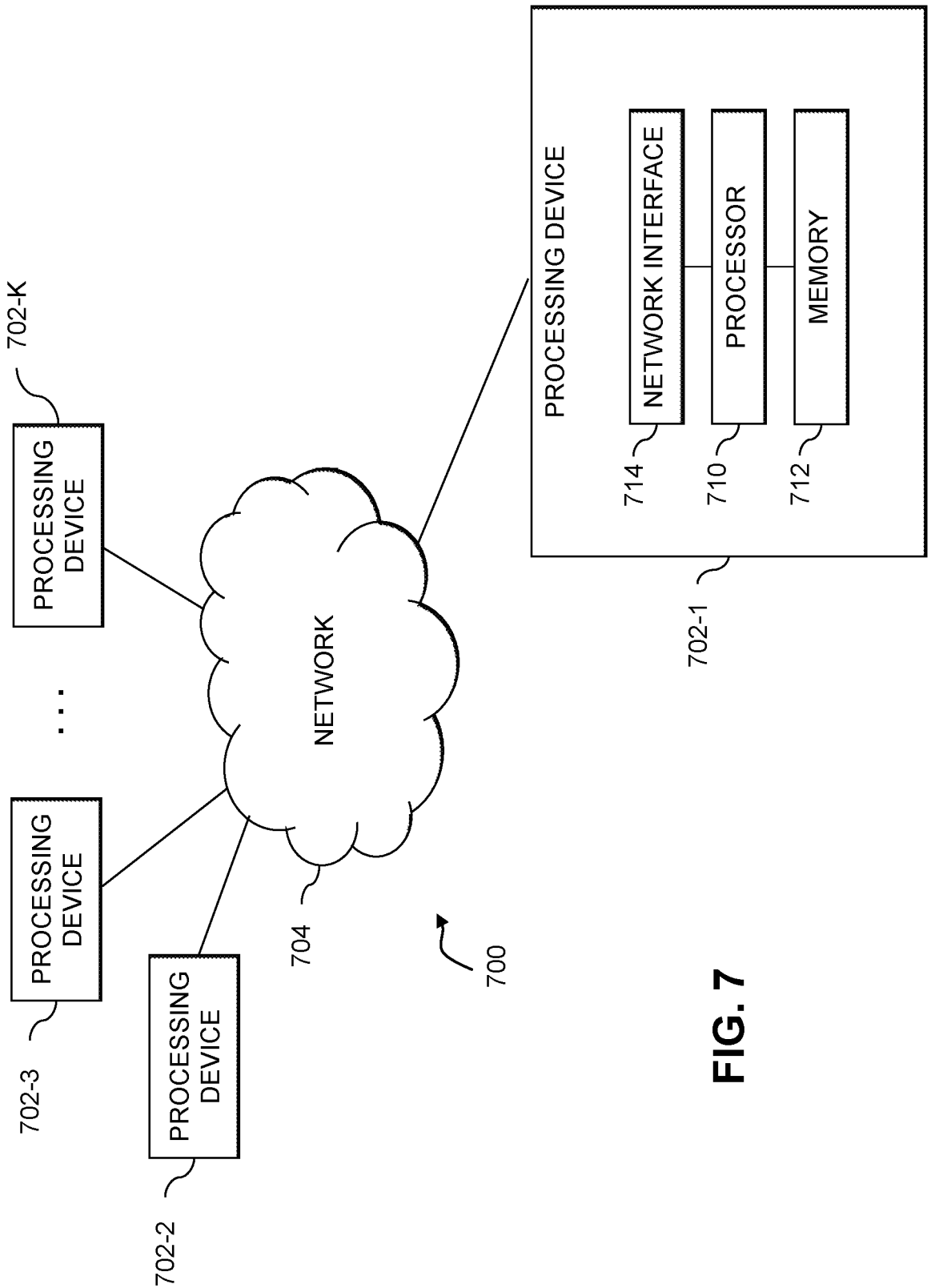

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for using web application components with different web application frameworks in a web application as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, web application frameworks, page elements, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising steps of:
executing a web application, the web application utilizing two or more different web application frameworks;
registering one or more web application components of the web application by defining one or more lifecycle triggers for loading the one or more web application components in one or more pages of the web application;
monitoring for the one or more lifecycle triggers on a communication channel for the web application;
detecting a given one of the lifecycle triggers to load a given one of the one or more web application components at a specified location on a given one of the one or more pages of the web application, wherein the given page of the web application utilizes a first one of the two or more different web application frameworks and the given web application component utilizes a second one of the two or more different web application frameworks;
loading an instance of the given web application component at the specified location of the given page of the web application; and
processing one or more interactions between the instance of the given web application component and the given page of the web application via the communication channel;

wherein the method is performed by at least one processing device comprising a processor coupled to a memory.

2. The method of claim 1 wherein the given web application component comprises at least one of a chart, a table, a plot, a visualization, and a user interface feature for controlling one or more elements of the given web page.

3. The method of claim 1 wherein registering the one or more web application components comprises at least one of bootstrapping and loading a first component provider for the first web application framework and a second component provider for the second application framework.

4. The method of claim 3 wherein:
the first component provider registers one or more lifecycle triggers for one or more web application components that utilize the first web application framework and listens for events on the communication channel corresponding to the one or more lifecycle triggers for the one or more web application components that utilize the first web application framework; and
the second component provider registers one or more lifecycle triggers for one or more web application components that utilize the second web application framework and listens for events on the communication channel corresponding to the one or more lifecycle triggers for the one or more web application components that utilize the second web application framework.

5. The method of claim 1 wherein detecting the given lifecycle trigger comprises detecting a request to display the given page of the web application.

6. The method of claim 5 further comprising, responsive to detecting the request to display the given page of the web application:
publishing a component listing request to the communication channel;
receiving metadata for the registered web application components from the communication channel, the metadata comprising information regarding availability of the registered web application components; and
determining whether the given web application component is available and compatible with the given page of the web application based at least in part on the received metadata.

7. The method of claim 1 wherein detecting the given lifecycle trigger comprises publishing a component request for the given web application component to the communication channel.

8. The method of claim 7 wherein the component request specifies a container for the given web application component, a configuration of the given web application component and one or more listeners for the given web application component.

9. The method of claim 8 wherein loading the instance of the given web application component at the specified location of the given page of the web application comprises:
analyzing the specified configuration of the given web application component in the component request for compatibility;
creating an instance of the given web application component running in the second web application framework;
injecting the instance of the given web application component at the specified location of the given page; and instantiating the one or more listeners to monitor for events on the communication channel corresponding to defined lifecycle triggers of the given web application component.

10. The method of claim 1 further comprising repeating the detecting, loading and processing steps for one or more additional detected lifecycle triggers for one or more additional web application components.

11. The method of claim 10 wherein the one or more additional web application components utilize the first web application framework.

12. The method of claim 10 wherein the one or more additional web application frameworks utilize a third one of the two or more different web application frameworks.

13. The method of claim 1 wherein registering the one or more web application components further comprises defining one or more lifecycle triggers for unloading the one or more web application components, and further comprising:
detecting a given one of the lifecycle triggers to unload the given web application component; and
removing the instance of the given web application component from the given page of the web application.

14. The method of claim 13 wherein detecting the given lifecycle trigger to unload the given web application component comprises detecting a request to change to another page of the web application.

15. A computer program product comprising a non-transitory processor-readable storage medium having stored therein program code of one or more software programs, wherein the program code when executed by at least one processing device causes the at least one processing device to perform steps of:
executing a web application, the web application utilizing two or more different web application frameworks;
registering one or more web application components of the web application by defining one or more lifecycle triggers for loading the one or more web application components in one or more pages of the web application;
monitoring for the one or more lifecycle triggers on a communication channel for the web application;
detecting a given one of the lifecycle triggers to load a given one of the one or more web application components at a specified location on a given one of the one or more pages of the web application, wherein the given page of the web application utilizes a first one of the two or more different web application frameworks and the given web application component utilizes a second one of the two or more different web application frameworks;
loading an instance of the given web application component at the specified location of the given page of the web application; and
processing one or more interactions between the instance of the given web application component and the given page of the web application via the communication channel.

16. The computer program product of claim 15 wherein detecting the given lifecycle trigger comprises publishing a component request for the given web application component to the communication channel, the component request specifying a container for the given web application component, a configuration of the given web application component and one or more listeners for the given web application component.

17. The computer program product of claim 15 wherein loading the instance of the given web application component at the specified location of the given page of the web application comprises:
- analyzing the specified configuration of the given web application component in the component request for compatibility;
- creating an instance of the given web application component running in the second web application framework;
- injecting the instance of the given web application component at the specified location of the given page; and
- instantiating the one or more listeners to monitor for events on the communication channel corresponding to defined lifecycle triggers of the given web application component.

18. An apparatus comprising:
- at least one processing device comprising a processor coupled to a memory;
- the at least one processing device being configured to perform steps of:
  - executing a web application, the web application utilizing two or more different web application frameworks;
  - registering one or more web application components of the web application by defining one or more lifecycle triggers for loading the one or more web application components in one or more pages of the web application;
  - monitoring for the one or more lifecycle triggers on a communication channel for the web application;
  - detecting a given one of the lifecycle triggers to load a given one of the one or more web application components at a specified location on a given one of the one or more pages of the web application, wherein the given page of the web application utilizes a first one of the two or more different web application frameworks and the given web application component utilizes a second one of the two or more different web application frameworks;
  - loading an instance of the given web application component at the specified location of the given page of the web application; and
  - processing one or more interactions between the instance of the given web application component and the given page of the web application via the communication channel.

19. The apparatus of claim 18 wherein detecting the given lifecycle trigger comprises publishing a component request for the given web application component to the communication channel, the component request specifying a container for the given web application component, a configuration of the given web application component and one or more listeners for the given web application component.

20. The apparatus of claim 18 wherein loading the instance of the given web application component at the specified location of the given page of the web application comprises:
- analyzing the specified configuration of the given web application component in the component request for compatibility;
- creating an instance of the given web application component running in the second web application framework;
- injecting the instance of the given web application component at the specified location of the given page; and
- instantiating the one or more listeners to monitor for events on the communication channel corresponding to defined lifecycle triggers of the given web application component.

\* \* \* \* \*